(12) United States Patent
Lehner et al.

(10) Patent No.: US 9,478,136 B2
(45) Date of Patent: Oct. 25, 2016

(54) METHOD FOR MONITORING AND SIGNALING A TRAFFIC SITUATION IN THE SURROUNDINGS OF A VEHICLE

(71) Applicant: Robert Bosch GmbH, Stuttgart (DE)

(72) Inventors: Philipp Lehner, Muehlacker (DE); Michael Schumann, Stuttgart (DE); Volker Niemz, Rutesheim (DE); Pascal Kanter, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/363,428

(22) PCT Filed: Nov. 20, 2012

(86) PCT No.: PCT/EP2012/073094
§ 371 (c)(1),
(2) Date: Jun. 6, 2014

(87) PCT Pub. No.: WO2013/083399
PCT Pub. Date: Jun. 13, 2013

(65) Prior Publication Data
US 2015/0025787 A1 Jan. 22, 2015

(30) Foreign Application Priority Data
Dec. 6, 2011 (DE) .................. 10 2011 087 774

(51) Int. Cl.
*G08G 1/16* (2006.01)
*B60Q 1/52* (2006.01)
(Continued)

(52) U.S. Cl.
CPC ................ *G08G 1/16* (2013.01); *B60Q 1/525* (2013.01); *B60Q 5/006* (2013.01); *B60Q 9/008* (2013.01); *B60W 30/09* (2013.01); *B60W 30/0956* (2013.01); *G08G 1/166* (2013.01)

(58) Field of Classification Search
CPC ...... B60Q 1/525; B60Q 5/006; B60Q 9/008; G08G 1/16; G08G 1/166; B60W 30/09; B60W 30/0956; G01S 13/93; G01S 13/931
See application file for complete search history.

(56) References Cited

U.S. PATENT DOCUMENTS 6,191,686 B1 * 2/2001 Gabriel ......................... 340/435
6,523,912 B1 * 2/2003 Bond, III .............. B60R 21/013
303/9

(Continued)

FOREIGN PATENT DOCUMENTS

DE 102 57 842 11/2003
DE 10 2005 002760 8/2005

(Continued)

*Primary Examiner* — Rodney Butler
(74) *Attorney, Agent, or Firm* — Norton Rose Fulbright US LLP

(57) ABSTRACT

A method for monitoring and signaling a traffic situation in the surrounding environment of a vehicle, a sensor acquiring a surrounding environment of the vehicle, an object at risk being recognized in the acquired environment, a collision probability and a prediction reliability being determined for the recognized object at risk, and when there is a given collision probability and a low prediction reliability an action of a first type being carried out, and when there is a given collision probability and a high prediction reliability an action of a second type being carried out. The present invention further relates to a driver assistance system for carrying out the method.

16 Claims, 2 Drawing Sheets

(51) Int. Cl.
  *B60Q 5/00* (2006.01)
  *B60Q 9/00* (2006.01)
  *B60W 30/09* (2012.01)
  *B60W 30/095* (2012.01)

(56) References Cited

U.S. PATENT DOCUMENTS

| | | | |
|---|---|---|---|
| 7,051,830 B2 * | 5/2006 | Enomoto | 180/274 |
| 7,059,444 B2 * | 6/2006 | Kachu | 180/268 |
| 7,440,823 B2 | 10/2008 | Yamamura et al. | |
| 2002/0036584 A1 * | 3/2002 | Jocoy et al. | 342/70 |
| 2003/0111287 A1 * | 6/2003 | Enomoto | 180/274 |
| 2004/0246114 A1 * | 12/2004 | Hahn | 340/435 |
| 2005/0060071 A1 * | 3/2005 | Winner | 701/36 |
| 2008/0269992 A1 * | 10/2008 | Kawasaki | 701/45 |
| 2009/0070039 A1 * | 3/2009 | Beuschel et al. | 701/301 |
| 2010/0253494 A1 * | 10/2010 | Inoue | 340/436 |
| 2010/0253594 A1 * | 10/2010 | Szczerba et al. | 345/7 |
| 2011/0246156 A1 * | 10/2011 | Zecha | G06K 9/00 703/6 |
| 2012/0016627 A1 * | 1/2012 | Nagura | 702/150 |
| 2012/0287276 A1 * | 11/2012 | Dwivedi et al. | 348/148 |
| 2014/0091989 A1 * | 4/2014 | Szczerba et al. | 345/7 |
| 2014/0309881 A1 * | 10/2014 | Fung et al. | 701/36 |

FOREIGN PATENT DOCUMENTS

| | | | |
|---|---|---|---|
| DE | 102005002760 A1 * | 8/2005 | G08G 1/16 |
| DE | 10 2005 056647 | 6/2006 | |
| DE | 10 2006 011481 | 9/2007 | |
| DE | 10 2008 046488 | 3/2010 | |
| DE | 10 2010 001954 | 9/2010 | |
| DE | 10 2009 029388 | 3/2011 | |

\* cited by examiner

METHOD FOR MONITORING AND SIGNALING A TRAFFIC SITUATION IN THE SURROUNDINGS OF A VEHICLE

FIELD OF THE INVENTION

The present invention relates to a method and to a driver assistance system for monitoring and signaling a traffic situation in the surrounding environment of a vehicle in order to prevent accidents with the vehicle.

BACKGROUND INFORMATION

There is a strong interest in avoiding accidents that arise when the vehicle is driven in reverse, for example by running over a pedestrian or bicyclist, or through a collision with a stationary object. German patent document DE 10 2009 052589 A1 concerns a system for monitoring and signaling a traffic situation in the surrounding environment of a vehicle that is equipped to warn another traffic participant situated in the surrounding environment of the vehicle, using a suitable arrangement, when a critical situation is present. An ultrasound system determines a critical situation when the home vehicle is for example in a semi-autonomous driving process, or in parking operation, and in addition at least one other traffic participant is present in the surrounding environment of the home vehicle. Given the presence of such a critical situation, optical signal devices such as warning blinkers of the vehicle, or acoustic signal devices such as the horn, can be set into operation in order to warn the traffic participant during reverse travel in the concrete risk situation.

German patent document DE 2009 029388 A1 concerns a method for supporting a driver during parking or when leaving a parking space. In situations in which an obstacle arises spontaneously, such as for example a pedestrian walking behind the vehicle that is to be parked in order to move from the street onto the sidewalk, the introduction of an emergency braking, or an outputting of a warning to the driver, is proposed, and risk-minimizing measures are carried out, such as an optical or acoustic warning, in order to protect the persons in the surrounding environment of the vehicle.

In the systems known from the existing art, it is disadvantageous that, in the case of the ultrasound systems, an object plausibilization first has to take place over a plurality of cycles until it is determined that an object at risk represents a potential collision object. During this time, valuable seconds are lost that could save the lives of at-risk traffic participants in the surrounding environment of the vehicle in some traffic situations.

SUMMARY OF THE INVENTION

An object of the present invention is to propose a method that effectively prevents accidents with traffic participants and with a vehicle, through early intervention.

The object is achieved by a method having the features according to the description herein, and by a driver assistance system having the features according to the description herein. Advantageous developments of the present invention are defined in the further description wherein.

Accordingly, it is provided that in a method for monitoring and signaling a traffic situation in the surrounding environment of a vehicle, a sensor acquires a surrounding environment of the vehicle, an object at risk is recognized in the acquired environment, a collision probability and prediction reliability are determined for the recognized object at risk, and, in the case of a given collision probability and a low prediction reliability, an action of a first type is carried out, and in the case of a given collision probability and a high prediction reliability an action of a second type is carried out.

The sensor may be an optical image sensor, in particular a monocular camera or stereo camera. It is particularly advantageous that in images of an optical sensor an object at risk can be recognized in a very short time. The image rate of the optical system can be between 15 Hz and 35 Hz, or still higher. In order to ensure a system capable of real-time operation, an image rate of at least 25 Hz should be chosen.

The recognition of the object at risk in the images of the optical sensor can include methods for calculating the optical flow on acquired digital images whose vector field describes the movement of a pixel between two time points, in particular time points t and t−1. If a collection of flow vectors, i.e. a segmented contiguous region, moves in a significantly different way than the surrounding field, in particular when the home vehicle's own movement has been eliminated from the field, then a self-moving object can be inferred from this. Because in the calculation of the flow field from which the vehicle's own movement has been eliminated a surface assumption also always has to be made, static and simultaneously raised objects also stand out from the flow field. However, as a rule self-moved objects are clearly distinguishable from static ones, so that a detection is possible here. The recognition of the object at risk in the images of the optical sensor can also include a texture-based method in which objects can be recognized using classifiers, and in particular in which trained classifiers can be used to recognize objects that have been learned by the classifiers. Here, the classifiers compare certain features of the image at particular positions, so-called regions of interest (ROI), with stored and/or learned features, and weight their similarity to one another.

If the similarity exceeds a threshold for a class, the ROI is correspondingly classified. The determination of the ROIs can here take place using a variety of methods, e.g. in the stereo case via the position of a 3-D stack. The recognition of the object at risk in the images of the optical sensor can also take place via 3-D information obtained from stereo cameras. Particularly advantageous are combinations of the named methods, because they can operate very robustly. In this way, an object at risk can be detected within only a few hundredths of a second.

The object at risk can be any traffic participant, in particular a pedestrian, a bicyclist, a vehicle, an animal, or the like. The object at risk can be a self-moving object that can be recognized particularly well using the method of optical flow, or it can be a stationary object, for example a standing pedestrian who is looking in a different direction and does not notice the approaching vehicle. The stationary object can be recognized particularly well via texture-based information or via 3-D information.

The recognized object at risk may be classified and a classification parameter is determined. The classification is particularly advantageous if a texture-based image recognition method is used for the recognition of the object at risk; this method already uses a classification in the recognition of the object. In the case of stereo cameras as well, a texture-based method must be used for the classification. Here, in particular a high criticality class can be provided that includes e.g. pedestrians, bicyclists, and vehicles, and a low criticality class can be provided that includes stationary obstacles that were nonetheless recognized as objects at risk because they for example produce an optical flow on the images of the optical sensor, such as opening doors of stationary vehicles or branches, moved by the wind, of trees or plants.

The action of the first type may include an output of an acoustic and/or optical warning signal to the recognized object at risk. Here it is particularly advantageous that the acoustic and/or optical warning to the recognized object at risk does not entail any significant intervention in the current traffic situation. The driver of the vehicle and other traffic participants are not startled by an abrupt driving maneuver such as braking or an evasive movement. An optical warning can include for example a single or multiple blinking of the rear warning blinking lights, or other lighting systems situated at the rear such as rear lights, brake lights, or rear fog lamps, and the blinking can be carried out both simultaneously at the left and right and also in alternating fashion at the left and right. An acoustic warning can include actuation of a horn and/or triggering of a continuous or periodic beeping signal; here a transmitter of the beeping signal can be situated in particular outside the vehicle, and can be used specifically in order to output the warning signal, or can also be usable for further purposes.

The action of the first type may include an outputting of an acoustic and/or optical and/or haptic warning signal to the driver of the vehicle. In this way, the driver is made capable of reacting to the risk himself. The acoustic signal can include a triggering of a continuous or periodic beeping signal, a transmitter of the beeping signal may be situated inside the vehicle, and/or can include a volume controlling of the car radio and/or a voice message, for example via car radio speakers. An optical warning signal can include for example an integration of a warning signal in a head-up display or in a head-down display. This integration can include an emphasis, for example in terms of color, or a blinking of the recognized object in a camera image, and/or can include a warning symbol emphasized by color and/or blinking, for example an icon on a camera image. The haptic signal can include a vibration that, if warranted, acts on the steering wheel repeatedly within a period of time of a few seconds, and that can be felt by the driver.

In the case in which objects of a low criticality class have been detected, the action of the first type can be that no warning is outputted to the object at risk; rather, only an acoustic and/or optical and/or haptic warning signal is outputted to the driver. In the case in which objects of a high criticality class have been detected, the action of the first type can be the outputting of an acoustic and/or optical warning to the traffic participant, and at the same time the outputting of an acoustic and/or optical and/or haptic warning signal to the driver.

After carrying out the action of the first type, for example after outputting an acoustic and/or optical warning to the traffic participant and/or after outputting an acoustic and/or optical and/or haptic warning signal to the driver, a further action can be carried out, for example again an acoustic and/or an optical warning to the traffic participant and/or an acoustic and/or optical and/or haptic warning signal to the driver if the situation has not become less critical and the prediction reliability continues to be low, or an action of the second type can be carried out if the prediction reliability has increased. The temporal spacing between the successive warning signals can be set so that they follow one another immediately, or can be set to a pause of a few seconds, for example 1 to 5 seconds, in particular 1 to 3 seconds.

The action of the second type may include an intervention in the drive train of the vehicle, in particular an introduction of a braking of the vehicle. The coupling of the vehicle may be actuated before the brake is actuated, and a gear is disengaged. It is particularly advantageous that this causes the vehicle to come to a stop, which defuses the critical situation.

The collision probability in a particular situation can relate to the circumstance that the recognized object at risk is situated in a travel tube or in a risk area of the vehicle, or threatens to become situated therein. The given collision probability can also relate to the circumstance that an assigned time until collision with the recognized object at risk has fallen below a defined value, in particular 3 seconds, 2 seconds, or 1 second.

The method may be used in the context of backover avoidance, i.e. avoidance of driving over traffic participants when driving in reverse, and/or as part of a parking assistance device. Particularly, when traveling backwards in reverse gear the optical and/or acoustic warning signals directed to the object at risk may be outputted only at the rear area of the vehicle. This is advantageous in that the signal differs from a standard signal of the warning blinking system and from a signal of the car alarm system, in which lighting devices, in particular blinkers, blink both in the front area and in the rear area of the vehicle, and if warranted in the side area of the vehicle, so that the warning signal will attract the attention of the traffic participants still more strongly. For this purpose, in the area of the rear of the vehicle a transmitter for a beeping signal can be provided specifically for the purpose of warning the traffic participants.

According to the present invention, in addition a computer program is proposed according to which one of the methods described herein is carried out when the computer program is executed on a programmable computer device. The computer program can for example be a module for implementing a driver assistance system or a subsystem thereof in a vehicle, or can be an application for driver assistance functions that can be executed on a smartphone. The computer program can be stored on a machine-readable storage medium, for example on a permanent or rewritable storage medium, or in allocation to a computer device, or on a removable CD-ROM, DVD, or USB stick. Additionally or alternatively, the computer program can be provided on a computer device, such as a server, for downloading, e.g. via a data network such as the Internet or a communication connection such as a telephone line or a wireless connection.

According to the present invention, in addition a driver assistance system is provided for executing one of the described methods, having
  a sensor for acquiring a surrounding environment of a vehicle,
  a component for recognizing objects in the acquired environment,
  a component for determining a prediction reliability concerning an object recognized in the environment,
  a component for determining a probability of collision of the recognized object with the vehicle, and
  a component for carrying out an action of a first type when there is a given collision probability and a low prediction reliability, and for carrying out an action of a second type when there is a given collision probability and a high prediction reliability.

The sensor for acquiring the surrounding environment of the vehicle may be fashioned as a part of a video system that records an image of a surrounding environment of the vehicle. The driver assistance system can have further sensors for recording a vehicle surrounding environment, in particular further optical sensors of a video system, ultrasound sensors, radar sensors and/or lidar sensors.

The driver assistance system can have a fusion component that combines the data of the optical sensor with the data of the ultrasound sensor and further processes these; for example, these data can be communicated to a display or to a collision monitoring system. The information obtained through the ultrasound and/or the video system concerning the surrounding environment of the vehicle can in this way be outputted to the driver, e.g. as a 3-D image of the surrounding environment from a top view, or from the driver's perspective, such that the detected object can be made particularly recognizable.

The component for carrying out the action of the first and/or of the second type may be coupled to optical, acoustic, and/or haptic warning signal emitters and/or to a drive train of the vehicle, which can be controlled by the component for carrying out the action of the first and/or of the second type.

Further exemplary embodiments and advantages of the present invention are described in the following with reference to the drawings.

DETAILED DESCRIPTION

Figure 1:
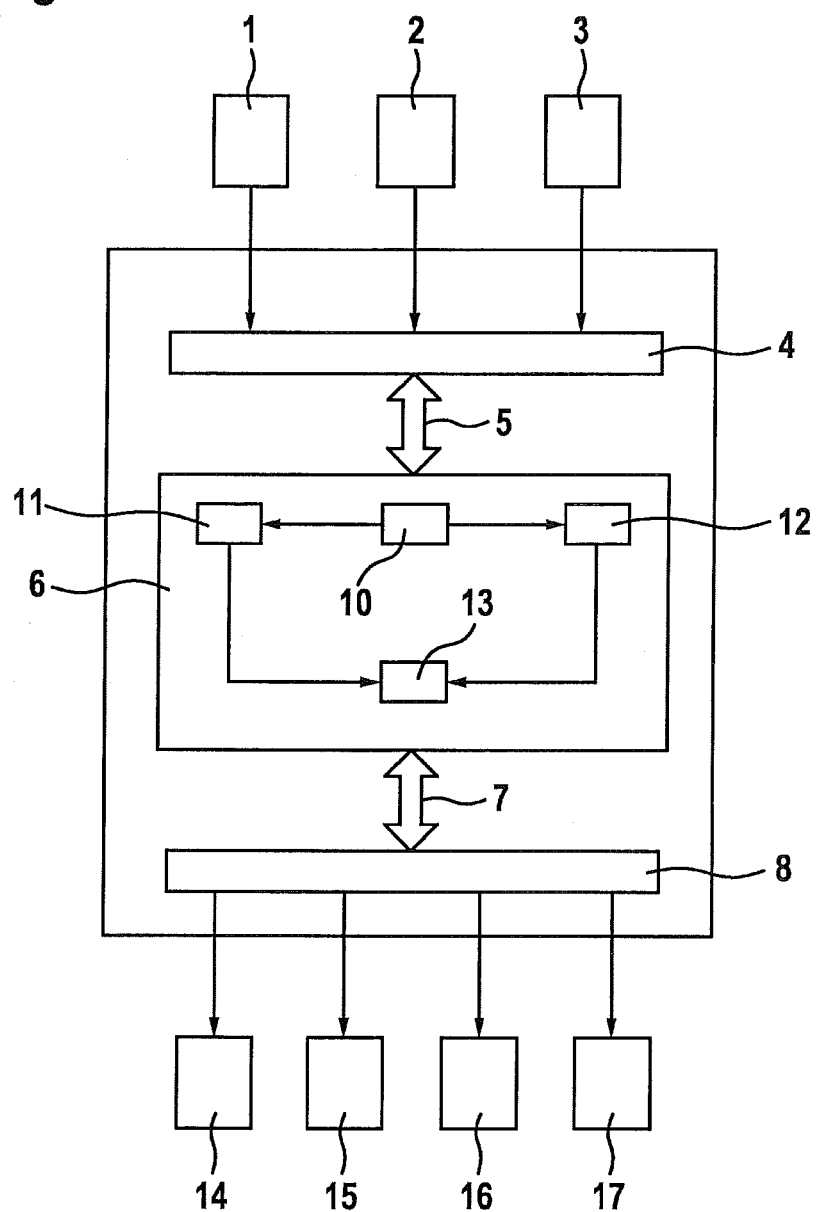
FIG. 1 shows a schematic representation of functional components of a data processing system in a vehicle.

FIG. 1 shows a schematic representation of functional components of a driver assistance system according to the present invention. The driver assistance system is configured to recognize, from data of a sensor, an object in a surrounding environment of a vehicle, to determine a prediction reliability concerning the object, and to carry out an action of a first type when there is a given collision probability and a low prediction reliability, and to carry out an action of a second type when there is a given collision probability and a high prediction reliability.

For this purpose, the driver assistance system includes image sensors of an optical sensor system 1, which can be fashioned as monocular or stereo video cameras. Moreover, the driver assistance system includes an ultrasound sensor system 2, as well as further sensors, in particular a vehicle data sensor system 3. The signals of optical sensor system 1, of ultrasound sensor system 2, and of vehicle data sensor system 3 are received in an input circuit 4. Input circuit 4 is connected to a bus system 5 for data exchange with a data processing device 6. Data processing device 6 is connected to a further bus system 7, or to the same bus system 5, with an output circuit 8.

Data processing device 6 includes a component 10 for recognizing an object in the surrounding environment of the vehicle, which in particular processes the data of optical sensor system 1 and/or of ultrasound sensor system 2. In the processing of the data of optical sensor system 1, component 10 for recognizing an object uses, in a known manner, for example image information such as optical contrast or vector flows (optical flow) obtained from image sequences, and/or 3-D information obtained from stereoscopic cameras.

Data processing device 6 also includes a component 11 for determining a production reliability concerning a recognized object, and which can directly process data of optical sensor system 1 and/or of ultrasound sensor system 2, and/or can use data of component 10 for recognizing the object. Component 11 for determining the prediction reliability concerning a recognized object first assigns a low prediction reliability to a recognized object. If, over a plurality of object recognition cycles and/or recognition methods such as optical flow, contour-based or 3-D methods, the recognized object becomes more plausible, component 11 for determining the prediction reliability assigns the object a high prediction reliability. If the object is plausibilized via a plurality of environment acquisition systems, for example via a camera, an ultrasound system, and/or via near-field radar, a component 11 for determining the prediction reliability also assigns a high prediction reliability to the object.

Data processing device 6 also includes a component 12 for determining a probability of collision with a recognized object, which component can process data of optical sensor system 1 and/or of ultrasound system 2, and/or can use data of component 10 in order to recognize the object. From the data of vehicle data sensor system 3, a speed of the vehicle can be determined. Component 12 for determining the collision probability processes this data and also further data of vehicle data sensor system 3 concerning a state of the tires of the vehicle, and from the state of the tires and the vehicle speed a travel tube of the vehicle can be determined, i.e. a path segment that will be traversed by the vehicle in a defined time period in the future.

A collision probability can be given when a recognized object is situated in the calculated travel tube of the vehicle. Moreover, to the extent that this is already possible from the received signals, a movement of the recognized object is extrapolated and a potential trajectory of the recognized object is determined. A collision probability can in addition be given when, based on the potential trajectory of the recognized object, it can be predicted that the object will in the future be situated in the calculated travel tube of the vehicle. Component 12 for determining the collision probability calculates, for the recognized object, a TTC, "time to collision"; i.e. a period of time until an impending collision of the vehicle with the recognized object takes place. If the calculated TTC is below a defined value, which can be for example 3 seconds, 2 seconds, or 1 second, then a probability of collision of the vehicle with the recognized object is assumed as given. The collision probability can thus in particular already be assumed when the recognized object has not yet been sufficiently plausibilized, because component 12 for determining the collision probability can operate independent of component 11 for determining the prediction reliability.

Data processing device 6 also includes a component 13 that can control output circuit 8 in particular as a function of signals of components 11 for determining the prediction reliability concerning the recognized object and as a function of signals of component 12 for determining the probability of collision with the recognized object. Via output circuit 8, optical signal emitters 14, acoustic signal emitters 15, haptic signal emitters 16, a brake device 17, and, if warranted, further vehicle components such as an engine controlling or a coupling can be controlled.

Figure 2:
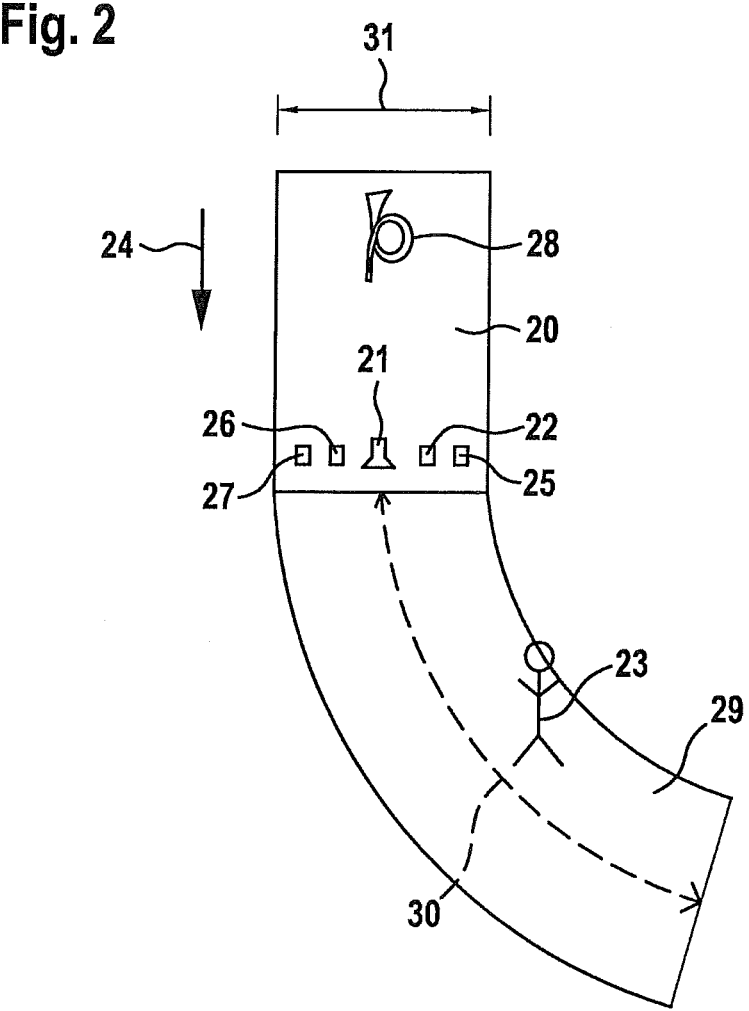
FIG. 2 shows a top view of a situation including a vehicle and a traffic participant.

FIG. 2 shows a top view of a situation including a vehicle 20 and a traffic participant 23. Indicated by an arrow 24, vehicle 20 is in an operating state in which it is traveling in reverse towards traffic participant 23. Vehicle 20 is equipped with a driver assistance system according to the present invention as described in relation to FIG. 1.

Traffic participant 23 is acquired for example by a rear view camera 21 and is recognized by a component for recognizing an object in the surrounding environment of the vehicle. Traffic participant 23 can in addition be acquired by an ultrasound system 22 and/or by further systems 25, for example a near-field radar system or a lidar system, and can also be recognized via these by the component for recognizing the object, which can include modules that evaluate the data thereof.

In addition, a travel tube 29 is shown that can be determined from a tire position of vehicle 20 and a current speed of vehicle 20. Travel tube 29 has a length 30 that can be calculated from the speed of vehicle 20 and from a predefined reaction time, for example 1 to 3 seconds, and has a width that corresponds approximately to a vehicle width 31. Alternatively or in addition, using one of the systems for acquiring the surrounding environment a potential travel path of the vehicle, for example an entry, can be detected, from which a region of risk for traffic participant 23 can be determined. Because traffic participant 23 is situated in travel tube 29, in the depicted case a probability of collision is given. A probability of collision is also given when there is a dwell time in a region at risk. Immediately after detection of traffic participant 23, this participant is assigned a low prediction reliability. Therefore, due to the collision risk an action of the first type is carried out. Here, traffic participant 23 can be warned of the vehicle 20 traveling in reverse, for example by switching on lights 26 situated on the rear of the vehicle, a beep signal emitter 27 situated on the rear of the vehicle, and/or by actuating a horn 28. In addition, the driver of vehicle 20 can be warned of traffic participant 23 by an acoustic and/or optical and/or haptic warning signal. If traffic participant 21 is plausibilized over a plurality of recognition cycles and/or via a plurality of sensor systems 21, 22, 25, then a high prediction reliability can be assigned to the participant. Given a high prediction reliability together with a continuing risk of collision, an automatic braking of vehicle 20 can be introduced in order to avoid the risk.

What is claimed is:

1. A driver assistance system for monitoring and signaling a traffic situation in a surrounding environment of a vehicle, comprising:
   two or more sensor systems to acquire a surrounding environment of a vehicle;
   a recognizing component to recognize objects in the acquired environment;
   a reliability determining component to determine a prediction reliability concerning an object recognized in the environment;
   a probability determining component to determine a probability of collision of the recognized object with the vehicle; and
   an action component to carry out an action of a first type when there is a given collision probability and a low prediction reliability, and to carry out an action of a second type when there is the given collision probability and a high prediction reliability, wherein after carrying out the action of the first type, when there is the given collision probability and the high prediction reliability, the an action of the second type is carried out, and wherein the high prediction reliability is determined when the object is recognized via each of a plurality of the sensor systems and determined to have the given collision probability.

2. The driver assistance system of claim 1, further comprising:
   an acoustic signal emitter situated on the rear side of the vehicle.

3. A method for monitoring and signaling a traffic situation in a surrounding environment of a vehicle, the method comprising:
   acquiring, via two or more sensor systems, a surrounding environment of the vehicle;
   recognizing an object at risk in the acquired environment;
   determining a collision probability and a prediction reliability for the recognized object at risk; and
   performing, for a given collision probability and a low prediction reliability, an action of a first type, and performing for the given collision probability and a high prediction reliability, an action of a second type, wherein after carrying out the action of the first type, when there is the given collision probability and the high prediction reliability, the action of the second type is carried out, wherein the high prediction reliability is assigned when the object is recognized via each of a plurality of the sensor systems and determined to have the given collision probability.

4. The method of claim 3, wherein the action of the first type includes an outputting at least one of an acoustic and an optical warning signal to the recognized object at risk.

5. The method of claim 3, wherein the action of the first type includes an outputting at least one of an acoustic and/or optical and a haptic warning signal to the driver of the vehicle.

6. The method of claim 3, wherein the action of the second type includes an intervention in the drive train of the vehicle.

7. The method of claim 3, wherein the given collision probability relates to the circumstance that the recognized object at risk is situated in a travel tube or in a region at risk of the vehicle, or threatens to become situated therein.

8. The method of claim 3, wherein the given collision probability relates to the circumstance that an assigned period of time until collision with the recognized object at risk has fallen below a defined value, in particular 3 seconds, 2 seconds, or 1 second.

9. The method of claim 3, wherein the action of the second type includes an intervention in the drive train of the vehicle, the intervention including an introduction of a braking of the vehicle.

10. The method of claim 3, wherein the given collision probability relates to the circumstance that an assigned period of time until collision with the recognized object at risk has fallen below a defined value of 3 seconds.

11. The method of claim 3, wherein the given collision probability relates to the circumstance that an assigned period of time until collision with the recognized object at risk has fallen below a defined value of 2 seconds.

12. The method of claim 3, wherein the given collision probability relates to the circumstance that an assigned period of time until collision with the recognized object at risk has fallen below a defined value of 1 second.

13. The method of claim 3, wherein the low prediction reliability is assigned when the object is recognized via only one of the plurality of sensor systems.

14. The method of claim 3 wherein the plurality of sensor systems includes at least two of the following:
   optical sensor system;
   ultrasound sensor system;
   radar sensor system; and
   lidar sensor system.

15. The method of claim 14 wherein the high prediction reliability is assigned when the object is recognized via the optical sensor system and the ultrasound sensor system and determined to have the given collision probability.

16. A non-transitory computer readable medium having a computer program thereon, which is executable by a processor, comprising:
  a program code arrangement having program code for monitoring and signaling a traffic situation in a surrounding environment of a vehicle, by performing the following:
  acquiring, via two or more sensor systems, a surrounding environment of the vehicle;
  recognizing an object at risk in the acquired environment;
  determining a collision probability and a prediction reliability for the recognized object at risk; and
  performing, for a given collision probability and a low prediction reliability, an action of a first type, and performing for the given collision probability and a high prediction reliability, an action of a second type,
  wherein after carrying out the action of the first type, when there is the given collision probability and the high prediction reliability, the action of the second type is carried out, wherein the high prediction reliability is assigned when the object is recognized via each of a plurality of the sensor systems and determined to have the given collision probability.

* * * * *